Figure 1:
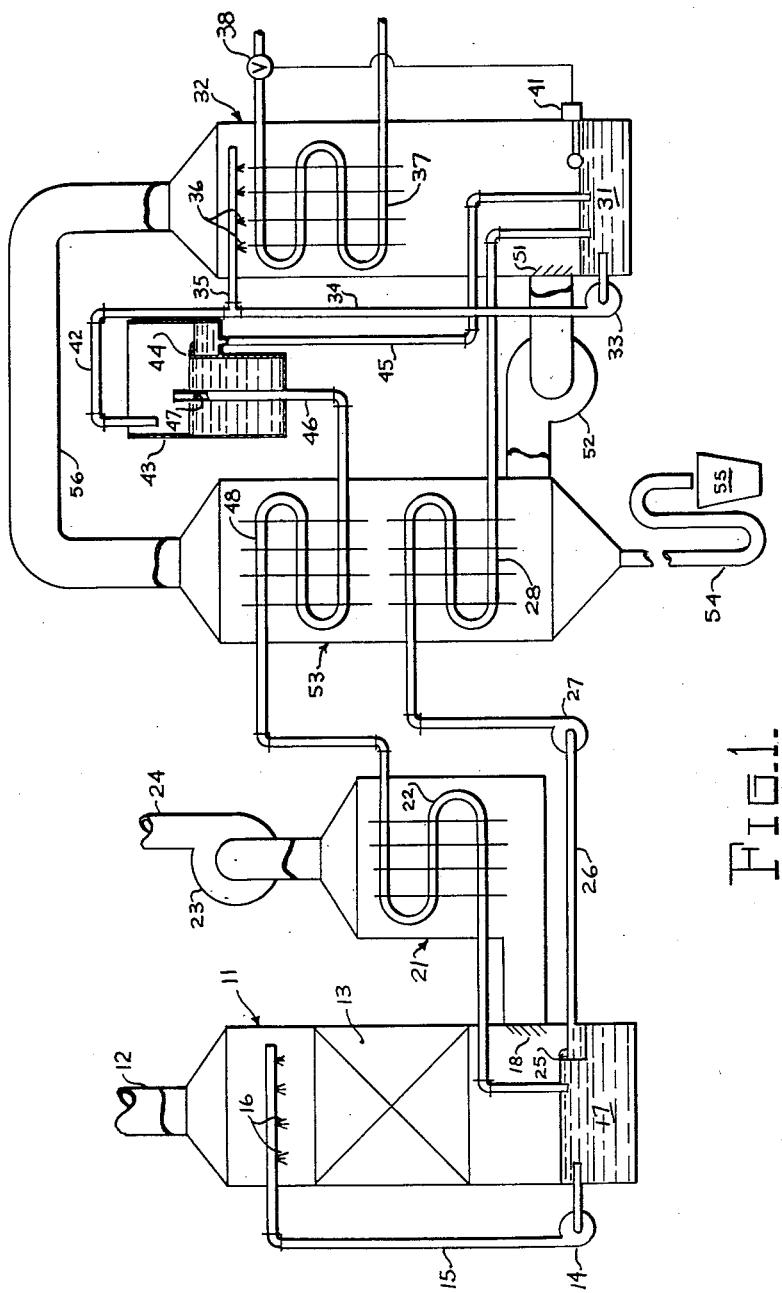

INVENTORS
DALE M. VALENTINE
GILBERT A. KELLEY
BY Charles I Haughey
atty

United States Patent Office

3,018,231
Patented Jan. 23, 1962

3,018,231
AIR CONDITIONING FOR REMOTE SPACES
Dale M. Valentine, Des Plaines, Ill., and Gilbert A. Kelley, Toledo, Ohio, assignors, by mesne assignments, to Midland-Ross Corporation, Cleveland, Ohio, a corporation of Ohio
Filed Oct. 22, 1957, Ser. No. 691,623
2 Claims. (Cl. 202—158)

This invention relates to air conditioners for controlling, and reducing, the humidity of the air to be conditioned. When it is desired to dehumidify air in remote spaces, such as mines and underground facilities, it becomes impractical to remove moisture by chemical air conditioning apparatus, where it is the custom to regenerate an absorbent and discharge moisture therefrom to an air stream, because of the requirements of space to duct external air to a remote regenerator to pick up the excess moisture and then vent the air stream to the external atmosphere, or the requirement of taking the desiccant material to an external area for regeneration.

This invention provides for regeneration of the chemical desiccant material at the site of the dehumidifier, and for disposal of the excess moisture in a manner which avoids the severe penalties above mentioned.

For consideration of what we believe to be novel and our invention, attention is directed to the following specification and the drawing and claims thereof.

Figure 2:
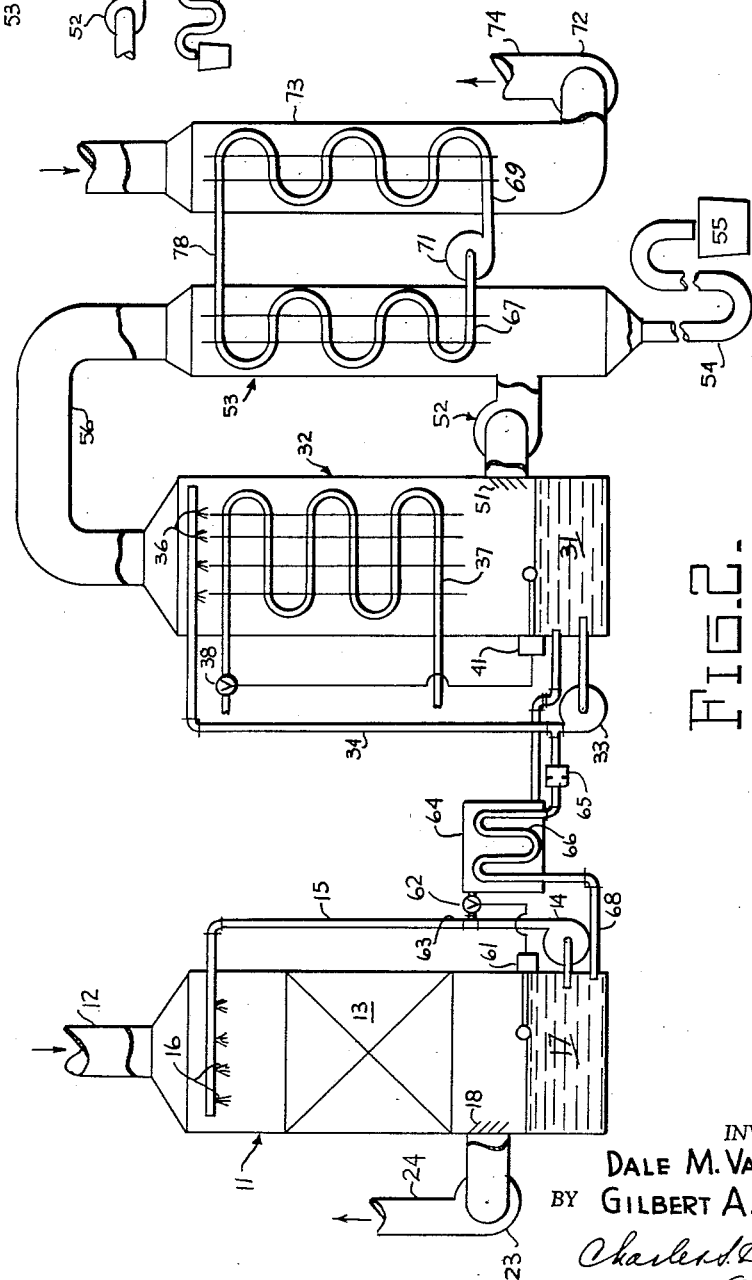
Figure 3:
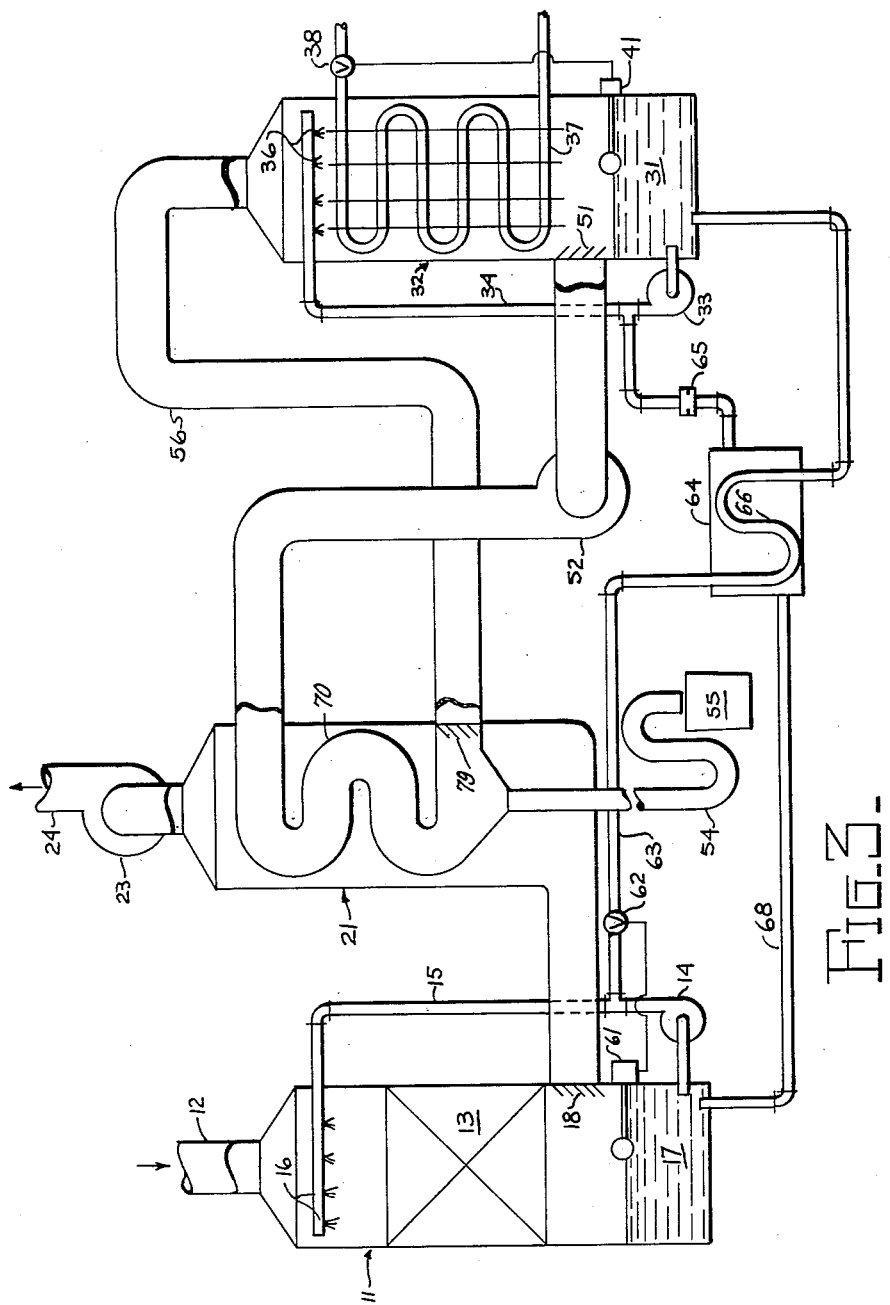

In the drawing:
FIG. 1 is a diagrammatic view of an air conditioning system according to this invention.
FIG. 2 is a diagrammatic view of an alternate system.
FIG. 3 is a diagrammatic view of another alternate system.
FIG. 4 shows a modification of a portion of the apparatus of FIG. 2.

FIG. 1 shows an application of a liquid desiccant system utilizing a lithium chloride solution according to the teachings of Bichowsky in U.S. Patent No. 1,992,177 and Kelley in U.S. Patent No. 2,798,570 to a mine or other underground facility in which a regenerator is operated with a substantially closed circuit of ventilating air, from which air moisture delivered thereto in the regeneration of the desiccant solution is subsequently condensed therefrom by indirect application of the cooling effect of air in the area. The heat transferred to the air by condensation of moisture from the regenerator is preferably applied to raise the temperature of the space conditioned, and the condensate is easily disposed of in liquid form by way of an existing drainage system, or may be pumped to the surface through a relatively small, inexpensive piping system.

A dehumidifying chamber or contactor 11 receives air to be conditioned through inlet duct 12. The air passes over an extended surface contactor 13, which may be a bed of berl saddles, where it contacts a stream of lithium chloride solution delivered thereto through pump 14, pipe 15 and nozzles 16. The solution drains to a sump 17 from which it is recirculated by the pump 14. The air stream leaves the contactor 11 through a spray eliminator 18 and a heat exchanger chamber 21, where it is heated by an incoming stream of warm solution in extended surface coil 22, and is returned to the conditioned space by a fan 23 and return air duct 24.

A relatively small stream of solution from the sump 17, as compared to the stream recirculated by pump 14, is circulated from below a weir 25 through a pipe 26 and pump 27, and through an extended surface heat exchange coil 28 and delivered to a sump 31 of a regenerator 32. Solution from the sump 31 is recirculated by pump 33 through pipes 34 and 35 and nozzles 36 over a heating surface 37 which is preferably a steam coil heated by steam delivered through control valve 38 subject to demand for heat as measured by a float type control 41. A side stream of solution from the sump 31 is delivered through pipes 34 and 42 to an overflow cup 43 of the type disclosed in Kelley and Rahm, U.S. Patent No. 2,700,536 in which solution level is maintained by a weir 44 and an excess flow of solution which drains over the weir 44, through pipe 45 and back to sump 31. Solution at a constant head thus enters a pipe 46 through holes 47, and flows by gravity through heat exchanger coils 48 and 22, and thence to the contactor sump 17.

In the regenerator 32, solution to be regenerated is recirculated by pump 33 over the steam coils 37, and a stream of air is drawn through the regenerator and through a spray eliminator 51 by a fan 52 and is delivered to a condensing chamber 53 where the warm, humid air contacts in turn the cool solution in coil 28 and the warm solution in coil 48. Condensation takes place on coil 28, and condensed moisture is discharged by gravity through a trap 54 to a drainage system represented by a container 55, which is preferably an inlet to a pump for pumping condensate to the mine surface, or the exterior of the chamber being conditioned. After the air passes the coil 28 it is somewhat cooler, and before returning this air to the regenerator chamber via duct 56 it is preferred to use it to precool the liquid being delivered from the regenerator sump 31 via the cup 43 to the contactor 13, thus increasing the efficiency of the absorption in the contactor as well as reducing the steam consumption by preheating this air stream.

In operation of the system of FIG. 1 air to be dehumidified and conditioned is drawn into the contactor 11 via inlet air duct 12, where it is dehumidified, is then passed over a solution coil 22 before returning to the conditioned space. It will be noted that the only source of cooling used here is the air being treated, and the relatively cool solution in the sump 17 is passed through the coil 28 to absorb the necessary heat to condense the moisture rejected by the regenerator system.

The foregoing system requires only power service to operate pumps and blowers, steam or other source of heat for the regenerator, and a drainage system for disposing of condensate. The system is, therefore, well suited for use in remote locations where there is no easy access to atmospheric air for discharge of moisture, and such heat as is generated by the system is preferably transferred to the air being treated.

In FIG. 2, where elements equal to corresponding elements in FIG. 1 have the same reference numbers, air enters the contactor 11 through inlet duct 12, passes over extended surface contactor 13, through spray eliminator 18 and is returned to the conditioned space by blower 23 and duct 24. Solution is recirculated by pump 14 through pipe 15 and nozzles 16 over surface 13 and back to the sump 17. The solution level in sump 17 is maintained by a float control 61 responsive to solution level which opens a valve 62 in pipe 63 to discharge solution through the valve as the solution level in the sump 17 rises. From pipe 63 solution passes through a heat exchanger 64 to the sump 31 of the regenerator 32. Solution from the sump 31 is recirculated by pump 33 through pipe 34 and nozzles 36 over a steam heating coil 37, and the solution level in sump 31 is controlled by valve 38 in the steam line responsive to the float control 41. A by-pass stream of solution from the regenerator is passed by pump 33 through a flow control orifice 65 and a coil 66 in heat exchanger 64 and through pipe 68 to the sump 17 of the contactor.

Air is drawn from the regenerator of FIG. 2 through a spray eliminator 51 by a fan 52 and is passed through a condensing chamber 53 then back to the top of the regenerator via duct 56 in a closed loop. The air stream in the condensing chamber 53 is cooled by a coolant such as water circulated in a closed cycle through a cooling coil 67 and a coil 69 by a pump 71. Coil 69 is placed in a duct 73 through which a stream of air from the space to be conditioned is passed by a blower 72 and ducts 73 and 74. If desired, the coil 69 may be placed in the outlet duct 24 to add heat to the conditioned air leaving the contactor, and fan 72 and ducts 73 and 74 may be eliminated.

Condensed moisture will run from coil 67 through trap 54 and into drainage system 55. It should be appreciated that the closed air circulation system in these regenerator cycles is subject to some "breathing," which may take place through the trap 54 or through other suitable vents, not shown.

If desired, the indirect heat exchange coil in condensing chamber 53 of FIG. 2 may be replaced by a direct contact condensate cooler as shown in FIG. 4 where the condensate from coil 67 is delivered through pipe 78 and spray nozzles 75 over a contact surface 76, and the trap 54 overflows from a sump 77 to maintain its level.

In FIG. 3, where equal parts to those of FIG. 1 are assigned equal numbers, the contactor 11 receives air through inlet duct 12, passes the air over surface 13, through spray eliminators 18 and through heat exchanger chamber 21, fan 23 and back to the conditioned space through outlet duct 24. The solution is recirculated from the sump 17 by pump 14 through pipe 15 and nozzles 16 over surface 13, whereon it contacts the air stream to absorb moisture therefrom.

Solution is delivered from pipe 15 through control valve 62 responsive to solution level in the sump as measured by float control 61, and is delivered through pipe 63, coil 66 in heat exchanger 64 and thence to the sump 31 of the regenerator 32. Solution from the sump 31 of the regenerator is recirculated by pump 33 through pipe 34 and nozzles 36 over steam coil 37, while solution level in the regenerator is controlled by operation of the steam valve 38 by the float control 41 responsive to the solution level, delivering more steam as solution level tends to rise. A by-pass stream of solution from the regenerator sump 31 is passed through a flow control orifice 65 and heat exchanger 64, thence by pipe 68 to the sump 17 of the contactor.

In operation of FIG. 3 apparatus, the dehumidified air leaving the contactor through the heat exchanger chamber 21 absorbs heat from an air stream delivered from the regenerator by fan 52 through a closed circuit comprising spray eliminator 51, heat exchange duct 70 in chamber 21, spray eliminator 79 and return duct 56 and back to the regenerator. The warm, humid air from the regenerator is cooled in the coil 70 as it in turn warms the air stream being dehumidified, and condensed moisture is discharged therefrom through trap 54 into drainage system 55.

As in FIGS. 1 and 2, the system of FIG. 3 utilizes air from the space to be conditioned to cool the moist air from the regenerator and condense moisture therefrom, and the moisture is then discharged in liquid form. While the system of FIG. 3 requires less heat exchange equipment, it does utilize an air-to-air heat exchanger which tends to be a large, costly item, so in some cases it will be preferred to use the liquid-to-air cooling system of FIG. 1 or 2.

In some cases, due to special conditions, the cooling capacity of the solution leaving the contactor sump to be regenerated will be sufficient to condense the necessary quantity of moisture from the regenerator air stream, as shown in the system of FIG. 1, but other conditions will dictate greater cooling capacities such as may be provided by the independent cooling of the system of FIG. 2.

It has been estimated in a particular mine dehumidifying proposal that to pipe a lithium chloride solution from a remote contactor to a regenerator on the ground surface outside of the mine, where atmospheric air was available for regeneration, would require over a million ($1,000,000.00) dollars invested in piping and in solution between the mine entrance and the remote units involved. There was in that case no possibility of providing duct work to deliver sufficient atmospheric air for regeneration and then discharging the hot, humid discharge from the regenerator to the surface. The systems of FIGS. 1, 2 and 3 avoid these problems by the use of a closed regenerator air circuit for condensing moisture, and utilizing the air from the conditioned space as a source of coolant to condense that moisture, while at the same time supplying some heat to the conditioned air.

We claim:

1. A chemical dehumidifying system for dehumidifying air for a space to be conditioned comprising, in combination: a contactor; means for passing a first stream of air through said contactor for conditioning therein; means for directing conditioned air into the space; means for passing absorbent liquid through said contactor in contact with said first stream of air passing therethrough; a regenerator; a condensing chamber; duct means for passing a second stream of air from said regenerator through said condensing chamber and back to said regenerator in a substantially closed air flow circuit; means for passing absorbent liquid through said regenerator in contact with said second stream of air passing therethrough; means for passing a first stream of absorbent liquid from said regenerator to said contactor; means for passing a second stream of absorbent liquid from said contactor to said regenerator; indirect heat exchange means comprising a tubular heat exchanger disposed in said condensing chamber and pipe means for passing said second stream of absorbent liquid from said contactor through said tubular heat exchanger before passing said second stream of absorbent liquid to said regenerator for absorbing heat from said second air stream, whereby moisture is condensed from said second air stream in said condensing chamber; means for passing said first stream of absorbent liquid in heat exchange relationship with said second air stream after said second air stream has been cooled by said heat exchanger; and means for discharging condensed moisture from said condensing chamber.

2. A chemical dehumidifying system for dehumidifying air for a space to be conditioned comprising, in combination: a contactor; means for passing a first stream of air through said contactor for conditioning therein; means for passing absorbent liquid through said contactor in contact with said first stream of air passing therethrough; a regenerator; a condensing chamber; duct means for passing a second stream of air from said regenerator through said condensing chamber and back to said regenerator in a substantially closed air flow circuit; means for passing absorbent liquid through said regenerator in contact with said second stream of air passing therethrough; means for passing a first stream of absorbent liquid from said regenerator to said contactor; means for passing a second stream of absorbent liquid from said contactor to said regenerator; a first indirect heat exchanger disposed in said condensing chamber; a second indirect heat exchanger; means for directing a stream of air into heat exchange relationship with said second heat exchanger, and then into the space to be conditioned; means for circulating a heat exchange fluid through said first and second heat exchangers in a closed circuit for transferring heat from said second air stream in said condensing chamber to the fluid, and, in said second heat exchanger, from the fluid to the air stream and from thence to the space to be conditioned; and means for discharging condensed moisture from said condensing chamber.

References Cited in the file of this patent

UNITED STATES PATENTS

| | | |
|---|---|---|
| 2,221,787 | Downs et al. | Nov. 19, 1940 |
| 2,367,695 | Spiselman | Jan. 23, 1945 |
| 2,428,643 | Young | Oct. 7, 1947 |
| 2,715,945 | Hankison | Aug. 23, 1955 |
| 2,798,570 | Kelley | July 9, 1957 |